United States Patent
Shiriike

(10) Patent No.: US 9,341,234 B2
(45) Date of Patent: May 17, 2016

(54) FRICTION DRIVE BELT

(75) Inventor: Hiroyuki Shiriike, Hyogo (JP)

(73) Assignee: BANDO CHEMICAL INDUSTRIES, LTD., Hyogo (JP)

(*) Notice: Subject to any disclaimer, the term of this patent is extended or adjusted under 35 U.S.C. 154(b) by 127 days.

(21) Appl. No.: 13/516,051

(22) PCT Filed: Nov. 18, 2010

(86) PCT No.: PCT/JP2010/006772
§ 371 (c)(1),
(2), (4) Date: Jun. 14, 2012

(87) PCT Pub. No.: WO2011/074182
PCT Pub. Date: Jun. 23, 2011

(65) Prior Publication Data
US 2012/0295748 A1 Nov. 22, 2012

(30) Foreign Application Priority Data
Dec. 14, 2009 (JP) .................... 2009-282890

(51) Int. Cl.
*F16G 1/06* (2006.01)
*F16G 5/20* (2006.01)
*F16G 5/06* (2006.01)

(52) U.S. Cl.
CPC ... *F16G 5/20* (2013.01); *F16G 5/06* (2013.01)

(58) Field of Classification Search
CPC ..................................... F16G 1/00; F16G 1/28
USPC .................. 474/148, 264, 238, 237
See application file for complete search history.

(56) References Cited

U.S. PATENT DOCUMENTS

| 5,211,608 A * | 5/1993 | Wong et al. ............... 474/202 |
| 5,610,217 A * | 3/1997 | Yarnell et al. ............ 524/397 |
| 5,711,734 A * | 1/1998 | Shioyama et al. ........ 474/260 |
| 6,464,607 B1 * | 10/2002 | Rosenboom et al. ..... 474/263 |
| 6,770,004 B1 * | 8/2004 | Lofgren et al. .......... 474/266 |
| 7,137,918 B2 * | 11/2006 | Nonnast et al. .......... 474/260 |

(Continued)

FOREIGN PATENT DOCUMENTS

| JP | 2007-170587 A | 7/2007 |
| JP | 2007-255635 A | 10/2007 |

(Continued)

OTHER PUBLICATIONS

International Search Report; PCT/JP2010/006772; Dec. 21, 2010.

*Primary Examiner* — William A Rivera
*Assistant Examiner* — Michael Riegelman
(74) *Attorney, Agent, or Firm* — Studebaker & Brackett PC

(57) ABSTRACT

A vehicle periphery monitoring system is provided, in which by matching a behavior of a semitransparent tire image with an operation from a driver's viewpoint, a feeling of strangeness is reduced, an intuitive space perception is assisted and also a moving direction and a behavior of a vehicle can be easily perceived. In a side-view monitor system an image processing controller converts a real camera image including a blind spot into an image to be viewed from a driver's viewpoint to generate a blind spot image, and superimposes a semitransparent vehicle image which is obtained by making a vehicle viewed from the driver's viewpoint semitransparent and a semitransparent tire image which is obtained by making a tire semitransparent and displaying a behavior following a handle operation viewed from the driver's viewpoint on the blind spot image.

14 Claims, 9 Drawing Sheets

(56) References Cited

U.S. PATENT DOCUMENTS

| | | | |
|---|---|---|---|
| 7,258,639 B2 * | 8/2007 | Tachibana et al. | 474/237 |
| 7,819,767 B2 * | 10/2010 | Nishida et al. | 474/237 |
| 7,988,577 B2 * | 8/2011 | Omori et al. | 474/249 |
| 8,197,372 B2 * | 6/2012 | Wu et al. | 474/263 |
| 8,475,310 B2 * | 7/2013 | Shiriike et al. | 474/238 |
| 2004/0018906 A1 * | 1/2004 | Sedlacek | 474/260 |
| 2004/0214674 A1 * | 10/2004 | Tachibana et al. | 474/237 |
| 2009/0011884 A1 | 1/2009 | Nakashima et al. | |
| 2009/0264236 A1 | 10/2009 | Omori et al. | |
| 2010/0203993 A1 * | 8/2010 | Matsukawa et al. | 474/251 |
| 2010/0298079 A1 | 11/2010 | Shiriike et al. | |
| 2010/0331129 A1 | 12/2010 | Mukai et al. | |
| 2011/0124453 A1 * | 5/2011 | Nakashima et al. | 474/139 |
| 2012/0058849 A1 * | 3/2012 | Yoshida | 474/148 |

FOREIGN PATENT DOCUMENTS

| | | |
|---|---|---|
| WO | 2008/007647 A1 | 1/2008 |
| WO | 2009/093465 A1 | 7/2009 |
| WO | 2009/101799 A1 | 8/2009 |
| WO | 2009/110150 A1 | 9/2009 |

* cited by examiner

FIG.2
(a)
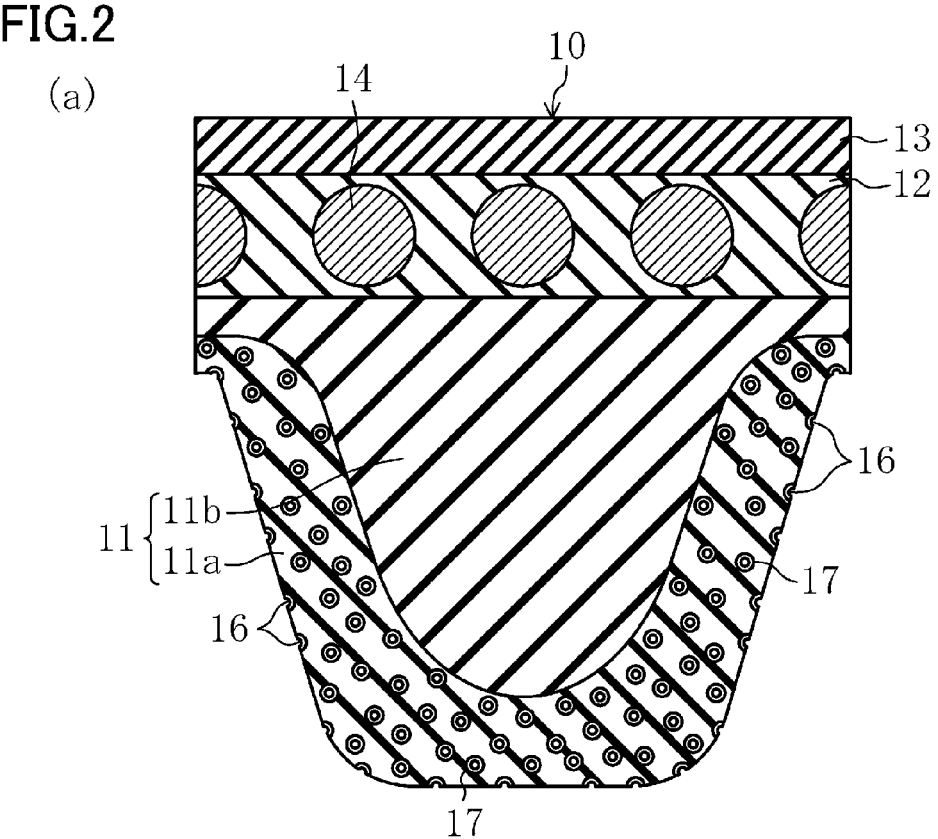
(b)
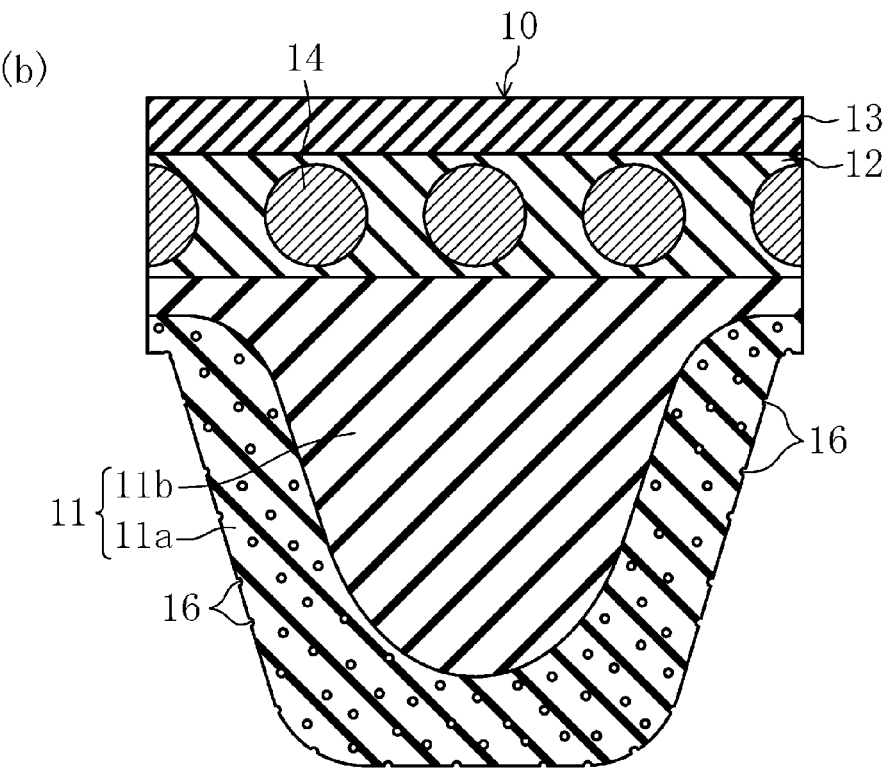

US 9,341,234 B2

FRICTION DRIVE BELT

TECHNICAL FIELD

The present disclosure relates to friction drive belts.

BACKGROUND ART

V-ribbed belts having a large number of pores on their pulley contact surfaces are known.

For example, Patent Document 1 describes a V-ribbed belt in which a portion including a pulley contact surface is at least partially made of a porous rubber composition having an air content of 5-20%.

Patent Document 2 describes a V-ribbed belt having a two-layer structure including an outer adhesion rubber layer and an inner compression rubber layer. In this V-ribbed belt, hollow particles are blended into a rubber composition forming the compression rubber layer, and part of the hollow particles exposed at the pulley contact surface is partially cut away to form a large number of cellular pores.

CITATION LIST

Patent Document

PATENT DOCUMENT 1: Japanese Patent Publication No 2007-255635
PATENT DOCUMENT 2: International Patent Publication No. WO2008/007647

SUMMARY OF THE INVENTION

The present disclosure relates to a friction drive belt including a compression rubber layer which is provided on an inner periphery of a belt body and transmits power between pulleys upon coming into contact with the pulleys, wherein the compression rubber layer includes a surface rubber layer including numerous pores on a pulley contact surface, and an inner rubber layer which is provided toward an inside of the belt relative to the surface rubber layer and whose storage modulus at 25° C. in a belt length direction is higher than that of the surface rubber layer and is in the range from 30 to 50 MPa.

BRIEF DESCRIPTION OF THE DRAWINGS

FIG. 2(a) is an enlarged cross-sectional view of a principal portion of the V-ribbed belt of the embodiment in which hollow particles are used.
FIG. 2(b) is an enlarged cross-sectional view of a principal portion of a V-ribbed belt of the embodiment in which a foaming agent is used.

DESCRIPTION OF EMBODIMENTS

An embodiment will be described below in detail with reference to the drawings.

Figure 1:
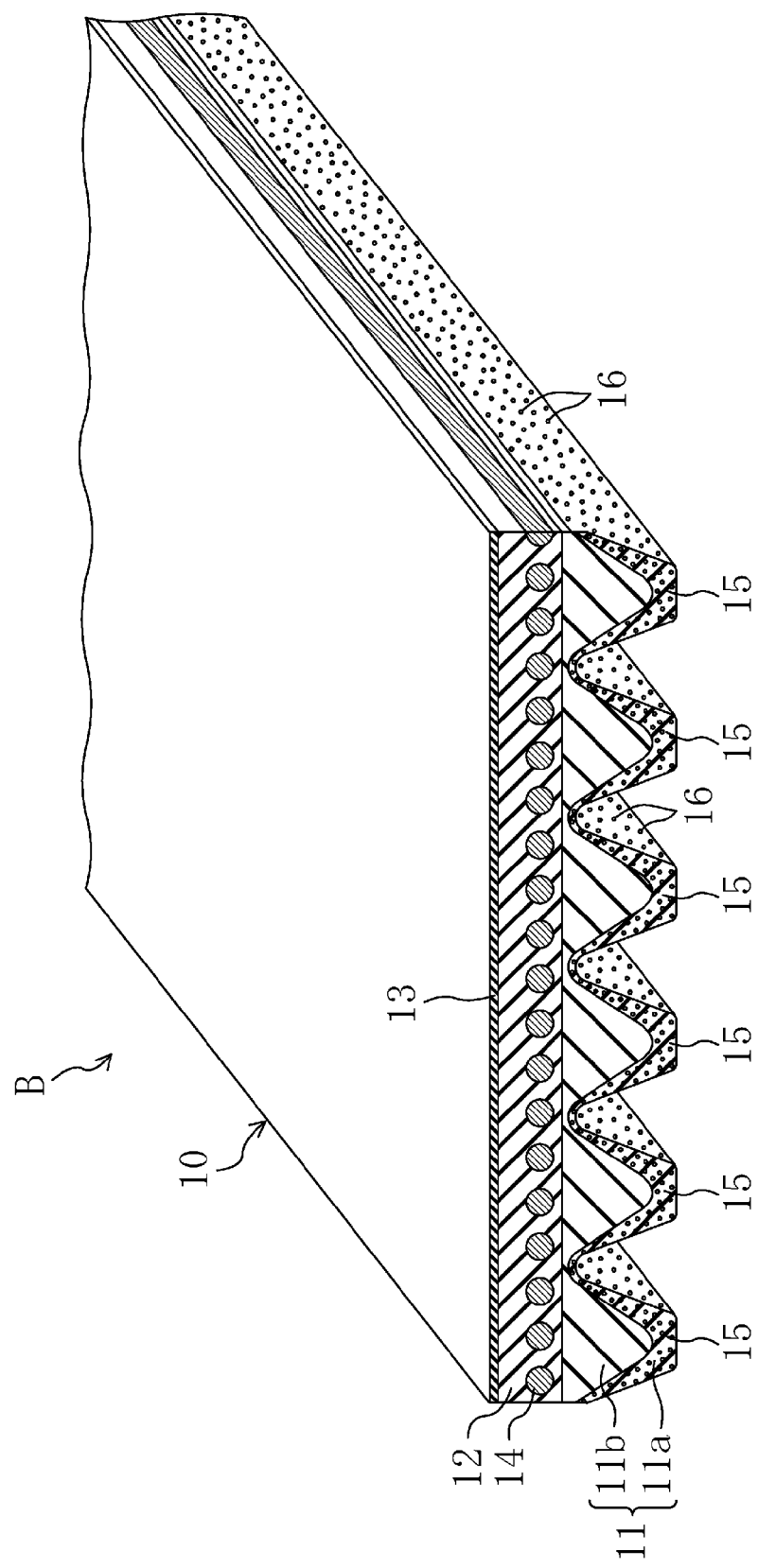
FIG. 1 is a perspective view illustrating a V-ribbed belt according to an embodiment.

FIG. 1 shows a V-ribbed belt B (a friction drive belt) according to the embodiment. The V-ribbed belt B of this embodiment is used in, for example, an accessory drive belt transmission system provided in an engine room of an automobile. The V-ribbed belt B of this embodiment has a belt total length of 700-3000 mm, a belt width of 10-36 mm and a belt thickness of 4.0-5.0 mm.

The V-ribbed belt B of this embodiment includes a V-ribbed belt body 10 having a three-layer structure made of a compression rubber layer 11 provided on the inner periphery of the belt, an intermediate adhesion rubber layer 12, and a backing rubber layer 13 provided on the outer periphery of the belt. The adhesion rubber layer 12 of the V-ribbed belt body 10 includes a cord 14 embedded therein in a spiral having pitches adjacent to each other along the belt width.

The compression rubber layer 11 has a plurality of V-ribs 15 rising inward relative to the inner periphery of the belt. The V-ribs 15 are each formed into a rib extending along the belt length and having a cross section in a substantially inverted triangular shape, and are arranged adjacent to each other along the belt width. Each of the V-ribs 15 has, for example, a rib height of 2.0-3.0 mm and a width of 1.0-3.6 mm at its root. The number of the V-ribs is, for example, from three to six (six in FIG. 1).

The compression rubber layer 11 includes a surface rubber layer 11a formed into a layer shape extending along the entire pulley contact surface, and an inner rubber layer 11b provided toward the inside of the belt relative to the surface rubber layer 11a. The surface rubber layer 11a has a thickness of 50-500 µm, for example.

Each of the surface rubber layer 11a and the inner rubber layer 11b included in the compression rubber layer 11 is made of a rubber composition which is cross-linked with a cross-linker by application of heat and pressure to a non-crosslinked rubber composition produced by blending various compounding ingredients into a base material rubber.

Examples of the base material rubber for the rubber composition forming each of the surface rubber layer 11a and the inner rubber layer 11b of the compression rubber layer 11 include: ethylene-α-olefin elastomers such as ethylene propylene copolymer (EPR), ethylene-propylene-diene terpolymer (EPDM), ethylene-octene copolymer, and ethylene-butene copolymer; chloroprene-rubber (CR); chlorosulfonated polyethylene rubber (CSM); and hydrogenated acrylonitrile rubber (H-NBR). Among the examples, an ethylene-α-olefin elastomer is preferably used as the base material rubber. The base material rubber may include either a single species or a mixture of two or more species. The rubber composition forming the surface rubber layer 11a and that forming the inner rubber layer 11b may be either the same or different from each other.

Examples of the compounding ingredients include reinforcing agents such as carbon blacks, softeners, processing aids, vulcanization aids, cross-linkers, vulcanization accelerators, resins for rubber compounding, and antioxidants.

Examples of the carbon blacks used as the reinforcing agents include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing agent. The reinforcing agent may include either a single species or two or more species. In order that resistance to wear and resistance to bending fatigue will be well balanced, 30-80 parts by mass of the reinforcing agent is preferably blended into 100 parts by mass of the base material rubber.

Examples of the softeners include: petroleum softeners; mineral oil-based softeners such as paraffin wax; and vegetable oil based-softeners such as castor oil, cottonseed oil, linseed oil, rapeseed oil, soybean oil, palm oil, coconut oil, peanut oil, Japan wax, rosin, and pine oil. The softener may be made of either a single species or two or more species. For example, 2-30 parts by mass of the softener is blended into 100 parts by mass of the base material rubber.

Examples of the processing aids include stearic acids. The processing aid may include either a single species or two or more species. For example, 0.5-5 parts by mass of the processing aid is blended into 100 parts by mass of the base material rubber.

Examples of the vulcanization aids include metal oxides such as magnesium oxide and zinc oxide (zinc white). The vulcanization aid may include either a single species or two or more species. For example, 1-10 parts by mass of the vulcanization aid is blended into 100 parts by mass of the base material rubber.

Examples of the cross-linkers include sulfur and organic peroxides. Sulfur or an organic peroxide may be used alone as the cross-linker. Both of sulfur and the organic peroxide may also be used in combination. For example, 0.5-4.0 parts by mass of sulfur as the cross-linker is blended into 100 parts by mass of the base material rubber. For example, 0.5-8 parts by mass of the organic peroxide as the cross-linker is blended into 100 parts by mass of the base material rubber.

Examples of the vulcanization accelerators include metal oxides, metal carbonates, fatty acids and the derivatives thereof. The vulcanization accelerator may include either a single species or two or more species. For example, 0.5-8 parts by mass of the vulcanization accelerator is blended into 100 parts by mass of the base material rubber.

Examples of the resins for rubber compounding include phenolic resin. The resin for rubber compounding may include either a single species or two or more species. For example, 0-20 parts by mass of the resin for rubber compounding is blended into 100 parts by mass of the base material rubber.

Examples of the antioxidants include amine-based agents, quinoline-based agents, hydroquinone derivatives, phenolic agents, phosphite-based agents. The antioxidant may include either a single species or two or more species. For example, 0-8 parts by mass of the antioxidant is blended into 100 parts by mass of the base material rubber.

Numerous pores 16 are formed on the pulley contact surface of the surface rubber layer 11a, i.e. on the surfaces of the V-ribs 15. The average pore size of the pores 16 is preferably 40-150 µm and more preferably 80-120 µm. The average pore size of the pores 16 is calculated based on a number-average pore size of 50-100 pores measured by means of a surface image.

As shown in FIG. 2(a), the numerous pores 16 on the pulley contact surface of the surface rubber layer 11a may be made of partially cut away hollow particles 17 blended into the rubber composition forming the surface rubber layer 11a. Examples of the hollow particles 17 include EXPANCEL 092-120 (manufacturer: Japan Fillite Co., Ltd, particle size: 28-38 µm), EXPANCEL 009-80 (manufacturer: Japan Fillite Co., Ltd, particle size: 18-24 µm), ADVANCELL EMH204 (manufacturer: Sekisui Chemical Co., Ltd., particle size: 23-29 µm), ADVANCELL EMS-026 (manufacturer: Sekisui Chemical Co., Ltd., particle size: 25-35 µm), MATSUMOTO MICROSPHERE F-80S (manufacturer: Matsumoto Yushi-Seiyaku Co., Ltd., particle size: 20-30 µm), and MATSUMOTO MICROSPHERE F-190D (manufacturer: Matsumoto Yushi-Seiyaku Co., Ltd., particle size: 30-40 µm). The particle size of the hollow particles 17 is preferably 10-45 µm and more preferably 18-40 µm. The hollow particles 17 are blended preferably in an amount of 0.5-10 parts by mass and more preferably in an amount of 1-5 parts by mass into 100 parts by mass of the base material rubber.

As shown in FIG. 2(b), the numerous pores 16 on the pulley contact surface of the surface rubber layer 11a may be formed by partially cut away hollows produced by a foaming agent blended into the rubber composition forming the surface rubber layer 11a. Examples of the foaming agent include CELLMIC CAP-500 (manufacturer: Sankyo Kasei Co., Ltd.). The foaming agent is blended preferably in an amount of 1-15 parts by mass and more preferably in an amount of 3-8 parts by mass into 100 parts by mass of the base material rubber.

The rubber composition forming the surface rubber layer 11a may contain short fibers. The short fibers are preferably oriented in the belt width direction. Part of the short fibers exposed at the pulley contact surface preferably has their ends protruding from the pulley contact surface. Examples of the short fibers include nylon short fibers, aramid short fibers, polyester short fibers, and cotton short fibers. For example, the short fibers may be manufactured through an adhesion treatment in which the fibers are soaked in a resorcinol formaldehyde latex aqueous solution (an RFL aqueous solution) and then heated. The short fibers have a length of 0.2-3.0 mm, for example. For example, 3-30 parts by mass of the short fibers are blended into 100 parts by mass of the base material rubber. The rubber composition forming the surface rubber layer 11a may not contain short fibers.

The surface rubber layer 11a has a storage modulus (E') at 25° C. in the belt length direction ranging preferably 20-45 MPa, and more preferably 35-40 MPa. The storage modulus (E') at 25° C. is measured in accordance with Japanese Industrial Standards (JIS) K6394.

The rubber composition forming the inner rubber layer 11b does not contain the hollow particles 17 and the foaming agent. Accordingly, the inner rubber layer 11b does not contain hollows similar to the ones that the surface rubber layer 11a contains. The rubber composition forming the inner rubber layer 11b preferably contains no short fibers. The storage modulus (E') at 25° C. in the belt length direction of the inner rubber layer 11b is preferably higher than that of the surface rubber layer 11a, and is preferably 30-50 MPa and more preferably 35-45 MPa.

The adhesion rubber layer 12 is formed into a band shape with a rectangular cross section and has a thickness of 1.0-2.5 mm, for example. The backing rubber layer 13 is also formed into a band shape with a rectangular cross section and has a thickness of 0.4-0.8 mm, for example. In order to reduce noise produced between the belt back face and a flat pulley in contact with the belt back face, the surface of the backing rubber layer 13 preferably has a transferred weave pattern of woven fabric.

Each of the adhesion rubber layer 12 and the backing rubber layer 13 is preferably made of a crosslinked rubber composition which is cross-linked with a cross-linker by application of heat and pressure to a non-crosslinked rubber composition produced by blending various compounding ingredients into base material rubber. In order to reduce adhesion produced by contact between the belt back face and the flat pulley, the backing rubber layer 13 is preferably made of a rubber composition which is slightly harder than that of the adhesion rubber layer 12.

Examples of the base material rubber for the rubber composition forming the adhesion rubber layer 12 and the backing rubber layer 13 include ethylene-α-olefin elastomers, chloroprene-rubber (CR), chlorosulfonated polyethylene rubber (CSM) and hydrogenated acrylonitrile rubber (H-NBR). The base material rubber of the adhesion rubber layer 12 and the backing rubber layer 13 is preferably the same as that of the compression rubber layer 11.

In a manner similar to the compression rubber layer 11, examples of the compounding ingredients include reinforcing agents such as carbon blacks, softeners, processing aids, vulcanization aids, cross-linkers, vulcanization accelerators, resins for rubber compounding, and antioxidants.

The rubber compositions forming the inner rubber layer 11b of the compression rubber layer 11, the adhesion rubber layer 12, and the backing rubber layer 13 may be either different from each other or the same in constitution.

The cord 14 is made of twisted yarn of polyester fibers (PET), polyethylene naphthalate fibers (PEN), aramid fibers, vinylon fibers, etc. In order that the cord 14 has adhesion to the V-ribbed belt body 10, the cord 14 is subjected to an adhesion treatment in which the cord is soaked in an RFL aqueous solution and then heated and/or an adhesion treatment in which the cord is soaked in rubber cement and then dried, prior to molding the V-ribbed belt.

Meanwhile, there is a growing need for alleviation of noise produced in traveling automobiles. Such a need has created demands for a V-ribbed belt running in an engine room to reduce slip noise generated in running of the V-ribbed belt in a wet state and to alleviate reduction of power transmission capacity in running of the V-ribbed belt in a wet state. To meet the demands, in the V-ribbed belt B having the structure described in the embodiment, the compression rubber layer 11 includes the surface rubber layer 11a and the inner rubber layer 11b, the numerous pores 16 are formed on the pulley contact surface of the surface rubber layer 11a, the storage modulus (E') at 25° C. in the belt length direction of the inner rubber layer 11b is higher than that of the surface rubber layer 11a and is 30-50 MPa. This structure can reduce slip noise generated in running of the V-ribbed belt in a wet state and alleviate reduction of power transmission capacity in running of the V-ribbed belt in a wet state.

A method for fabricating the V-ribbed belt B of the embodiment will be described next.

Figure 3:
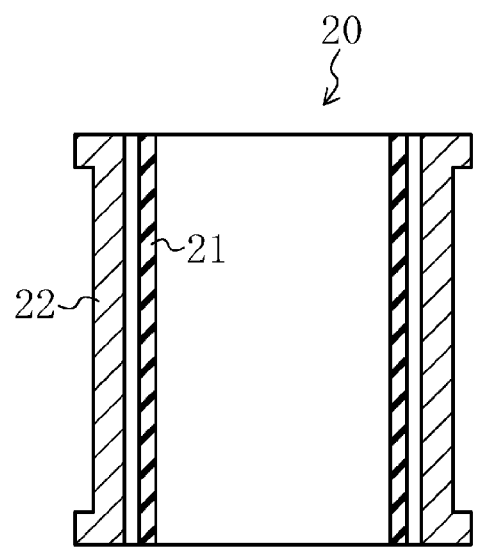
FIG. 3 is a longitudinal cross-sectional view of a belt forming mold.
Figure 4:
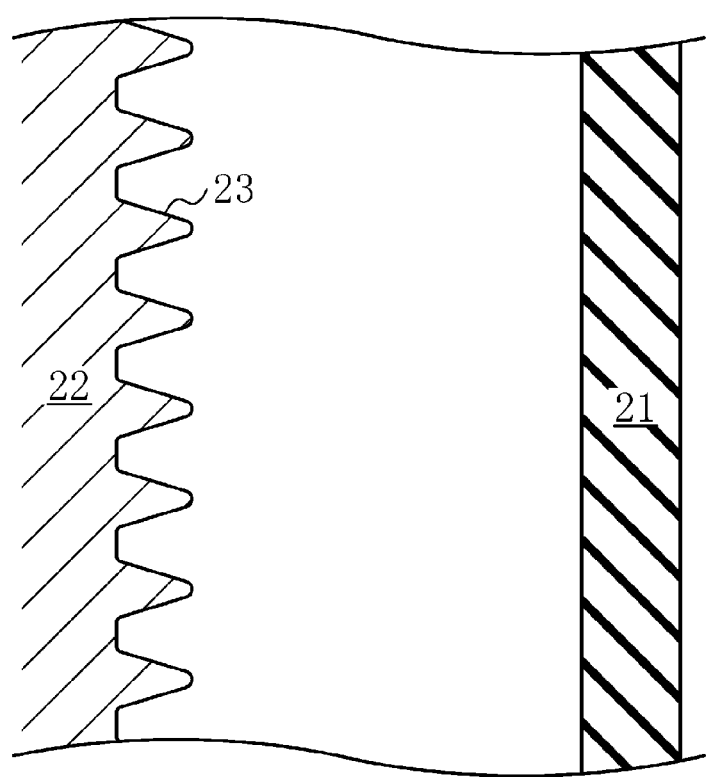
FIG. 4 is an enlarged longitudinal cross-sectional view of a portion of the belt forming mold.

A belt forming mold 20 is used to fabricate the V-ribbed belt B of the embodiment. As shown in FIGS. 3 and 4, the belt forming mold 20 includes a cylindrical inner mold 21 and a cylindrical outer mold 22, which are provided concentrically.

In this belt forming mold 20, the inner mold 21 is made of a flexible material such as rubber. The outer mold 22 is made of a rigid material such as a metal. The inner periphery surface of the outer mold 22 serves as a molding surface, and grooves 23 for forming the V-ribs are provided in the axial direction at regular intervals on the inner periphery surface of the outer mold 22. The outer mold 22 is provided with a temperature control mechanism which allows a heating medium such as water vapor or a cooling medium such as water to flow. This belt forming mold 20 is provided with a pressurizing means for pressurizing and expanding the inner mold 21 from the inside.

In fabrication of the V-ribbed belt B of this embodiment, non-crosslinked rubber sheets 11a' and 11b' for the surface rubber layer and the inner rubber layer of the compression rubber layer 11 are first produced by blending the compounding agents into the base material rubber, kneading the resultant blend with a kneading machine such as a kneader and a Banbury mixer, and molding the resultant non-crosslinked rubber composition into a sheet shape by calender molding and the like. Non-crosslinked rubber sheets 12' and 13' for the adhesion rubber layer and the backing rubber layer are also produced in a similar manner. Twisted yarn 14' for forming the cord is subjected to the adhesion treatment in which the yarn is soaked in an RFL aqueous solution and then heated, and thereafter to the adhesion treatment in which the yarn is soaked in rubber cement and then dried.

Figure 5:
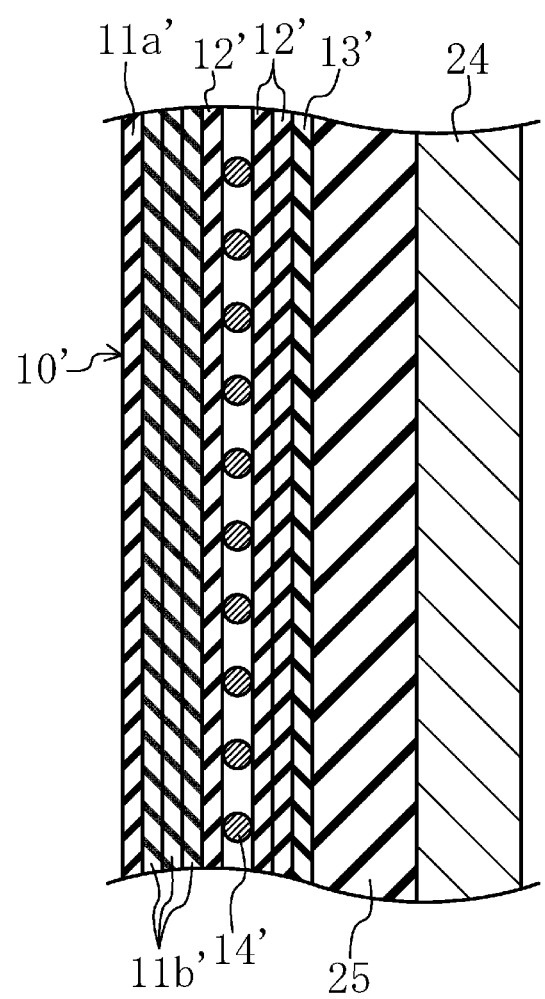
FIG. 5 is an illustration showing a step of forming a multilayer member.

Then, as shown in FIG. 5, a rubber sleeve 25 is placed on the outer periphery of a cylindrical drum 24 having a smooth surface. Thereafter, the non-crosslinked rubber sheet 13' for the backing rubber layer and the non-crosslinked rubber sheet 12' for the adhesion rubber layer are wrapped around the rubber sleeve 25 in this order to form layers. The twisted yarn 14' for the cord is winded around the resultant layers in a helical manner with respect to the cylindrical inner mold 21. Further, the non-crosslinked rubber sheet 12' for the adhesion rubber layer, the non-crosslinked rubber sheet 11b' for the inner rubber layer of the compression rubber layer 11, and the non-crosslinked rubber sheet 11a' for the surface rubber layer of the compression rubber layer 11 are wrapped around over the twisted yarn 14' in this order, thereby producing a multilayer member 10'.

Figure 6:
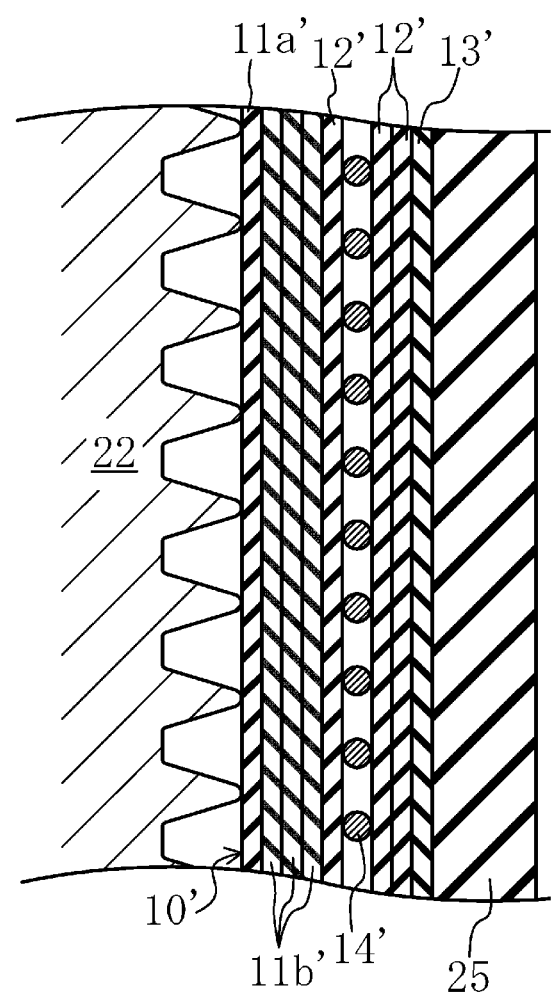
FIG. 6 is an illustration showing a step of setting the multilayer member in an outer mold.

The rubber sleeve 25 on which the multilayer member 10' is formed is subsequently removed from the cylindrical drum 24, and then put inside the outer mold 22, as shown in FIG. 6.

Figure 7:
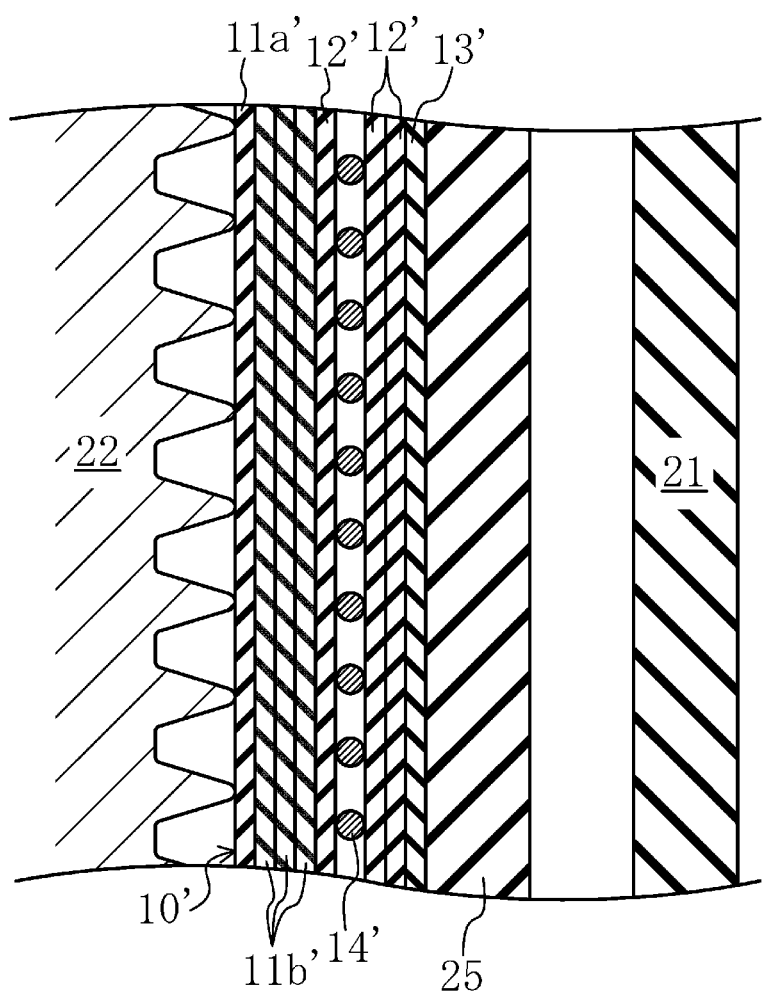
FIG. 7 is an illustration showing a step of setting the outer mold outside an inner mold.

Next, as shown in FIG. 7, the inner mold 21 is positioned inside the rubber sleeve 25 set in the outer mold 22, and then, hermetically sealed.

Figure 8:
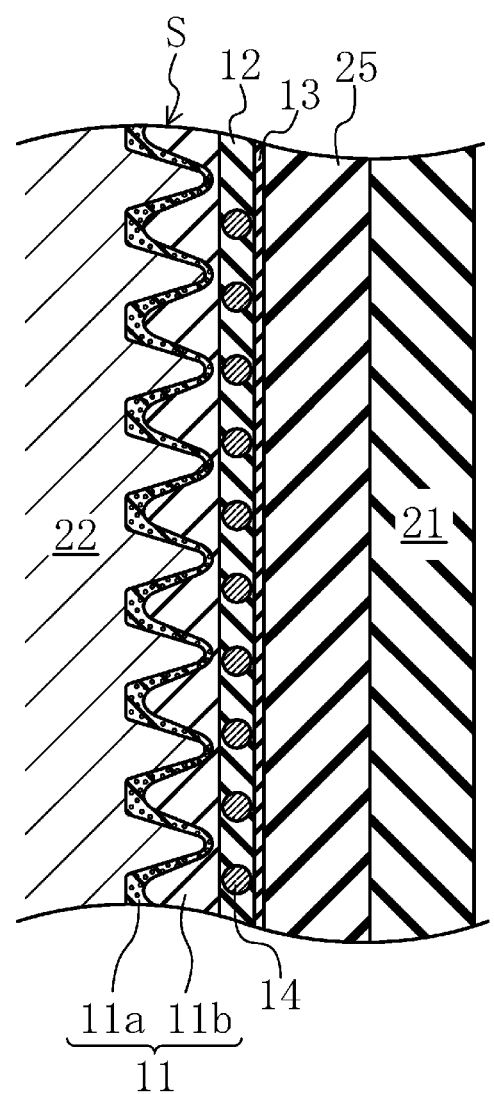
FIG. 8 is an illustration showing a step of forming a belt slab.

The outer mold 22 is heated and the inner mold 21 is pressurized by introducing, for example, high-pressure air into its hermetically-sealed inner space. In this step, as shown in FIG. 8, the inner mold 21 expands and the non-crosslinked rubber sheets 11a', 11b', 12' and 13' for molding belt of the multilayer member 10' are compressed on the molding surface of the outer mold 22. At the same time, cross-linking is promoted in the sheets, and the sheets are integrated and combined with the twisted yarn 14'. Further, the hollow particles 17 or the foaming agent contained in the non-crosslinked rubber sheet 11a' forms numerous hollows in the portion corresponding to the surface rubber 11a. Through these steps, a belt slab S in a cylindrical shape is formed. The molding temperature of the belt slab S is, for example, 100-180° C., the molding pressure thereof is, for example, 0.5-2.0 MPa, and the molding time is, for example, 10-60 minutes.

The inner space of the inner mold 21 is reduced in pressure to be released from the hermetically sealed state, and the belt slab S formed between the inner mold 21 and the outer mold 22 with the rubber sleeve 25 interposed therebetween is removed. The belt slab S is cut into rings having a predetermined width, and each ring is turned inside out, thereby obtaining the V-ribbed belt B. The outer periphery of the belt slab S, i.e., the surface having the V-ribs 15 may be ground, if necessary. This grinding partially cuts away the hollow particles 17 contained in the rubber composition forming the surface rubber layer 11a or the hollows formed by the foaming agent blended in the rubber composition forming the surface rubber layer 11a, thereby ensuring exposure of the pores 16 at the surface having the V-ribs 15.

Figure 9:
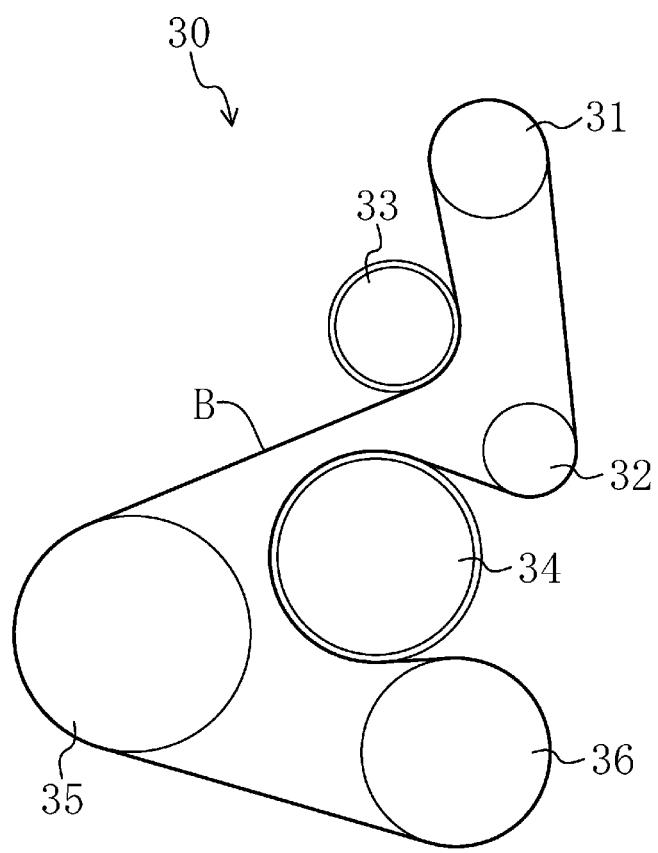
FIG. 9 is a diagram showing a layout of pulleys in an accessory drive belt transmission system for an automobile according to the embodiment.

FIG. 9 shows a layout of pulleys of an accessory drive belt transmission system 30 for an automobile using the V-ribbed belt B of this embodiment. This accessory drive belt transmission system 30 is a serpentine drive type system in which the V-ribbed belt B is allowed to run around six pulleys including four ribbed pulleys and two flat pulleys to transmit power.

The accessory drive belt transmission system 30 includes: a power steering pulley 31 which is an uppermost ribbed pulley; an AC generator pulley 32 which is a ribbed pulley disposed below the power steering pulley 31; a tensioner pulley 33 which is a flat pulley disposed downwardly leftward of the power steering pulley 31; a water-pump pulley 34 which is a flat pulley disposed below the tensioner pulley 33; a crankshaft pulley 35 which is a ribbed pulley disposed downwardly leftward of the tensioner pulley 33; and an air-conditioner pulley 36 which is a ribbed pulley disposed downwardly rightward of the crankshaft pulley 35. These pulleys are made of, for example, a pressed metal product, a casting product, or a resin molding product made of a nylon resin or phenolic resin, and their pulley diameters are 50-150 mm.

In the accessory drive belt transmission system 30, the V-ribbed belt B is allowed to run sequentially around the following components: the power steering pulley 31 with the surface having the V-ribs 15 in contact with the power steering pulley 31; the tensioner pulley 33 with the belt back face in contact with the tensioner pulley 33; the crankshaft pulley 35 and then the air-conditioner pulley 36 with the surface having the V-ribs 15 in contact with the pulleys 35 and 36; the water-pump pulley 34 with the belt back face in contact with the water-pump pulley 34; the AC generator pulley 32 with the surface having the V-ribs 15 in contact with the AC generator pulley 32; and then the power steering pulley 31 again. Belt span lengths which are the lengths of the parts of the V-ribbed belt B between the pulleys are 50-300 mm, for example. Misalignment produced between the pulleys is 0-2°.

Though the V-ribbed belt B is applied as the friction drive belt in this embodiment, the present disclosure is not particularly limited to this embodiment. A raw-edge type V-belt may be applicable to the present disclosure.

Though the V-ribbed belt body 10 of this embodiment is constituted by the compression rubber layer 11, the adhesion rubber layer 12, and the backing rubber layer 13, the present disclosure is not particularly limited to this embodiment. The V-ribbed belt body 10 may be constituted by the compression rubber layer 11, the adhesion rubber layer 12, and reinforcement fabric, which is provided in place of the backing rubber layer 13. This reinforcement fabric is made of, for example, woven fabric, knitted fabric, or unwoven fabric made of fibers such as cotton fibers, polyamide fibers, polyester fibers, and aramid fibers.

Though the accessory drive belt transmission system 30 is described as the belt transmission system in this embodiment, the present disclosure is not particularly limited to this embodiment. The present disclosure is applicable to belt transmission systems for general industries, for example.

EXAMPLES

Preparation of Materials for Belt

<Rubber Compositions for Surface Rubber Layer of Compression Rubber Layer>

Each of surface rubbers 1-10, as will be described below, was prepared as the rubber composition for the surface rubber layer of the compression rubber layer. The constitution of each of surface rubbers 1-10 is also shown in Table 1 or 2.

—Surface Rubber 1—

First, 100 parts by mass of EPDM (manufacturer: JSR Corporation, trade name: EP22) used as the base material rubber was blended with 80 parts by mass of an HAF carbon black (manufacturer: Tokai Carbon Co., Ltd., trade name: SEAST 3), 8 parts by mass of paraffinic oil (manufacturer: Sun Oil Company, trade name: SUNPAR 2280), 1 part by mass of a processing aid (manufacturer: NOF Corporation, trade name: STEARIC ACID CAMELLIA), 5 parts by mass of a vulcanization aid (manufacturer: Sakai Chemical Industry Co., Ltd., trade name: Zinc White No. 1), 2.3 parts by mass of a vulcanizer (manufacturer: Hosoi Chemical Industry Co., Ltd., trade name OIL SULFUR), 4 parts by mass of a vulcanization accelerator (manufacturer: Ouchi Shinko Chemical Industrial Co., Ltd., trade name: EP-150), 3 parts by mass of a resin for rubber compounding (manufacturer: Sumitomo Bakelite Co., Ltd., trade name: SUMILITERESIN PR-13355), and 5 parts by mass of hollow particles (manufacturer: Sekisui Chemical Co., Ltd., trade name: ADVANCELL EMS-026). The resultant blend was kneaded with a Banbury mixer and the kneaded blend was then rolled with calender rolls, thereby producing a non-crosslinked rubber sheet as surface rubber 1.

—Surface Rubber 2—

A non-crosslinked rubber sheet as surface rubber 2 was produced by the same method as that of surface rubber 1 except for changing the amount (with respect to 100 parts by mass of the base material rubber) of the paraffinic oil to 4 parts by mass, the vulcanization accelerator to 6 parts by mass, and the resin for rubber compounding to 10 parts by mass.

—Surface Rubber 3—

A non-crosslinked rubber sheet as surface rubber 3 was produced by the same method as that of surface rubber 1 except for changing the amount (with respect to 100 parts by mass of the base material rubber) of the HAF carbon black to 70 parts by mass, the paraffinic oil to 5 parts by mass, and the resin for rubber compounding to 5 parts by mass, and blending 5 parts by mass of a foaming agent (manufacturer: Sankyo Kasei Co., Ltd., trade name: CELLMIC CAP-500) as a substitute for the hollow particles into 100 parts by mass of the base material rubber.

—Surface Rubber 4—

A non-crosslinked rubber sheet as surface rubber 4 was produced by the same method as that of surface rubber 1 except for changing the amount (with respect to 100 parts by mass of the base material rubber) of the HAF carbon black to 70 parts by mass.

—Surface Rubber 5—

A non-crosslinked rubber sheet as surface rubber 5 was produced by the same method as that of surface rubber 1 except for changing the amount (with respect to 100 parts by mass of the base material rubber) of the HAF carbon black to 90 parts by mass, the paraffinic oil to 5 parts by mass, and the resin for rubber compounding to 5 parts by mass.

—Surface Rubber 6—

A non-crosslinked rubber sheet as surface rubber 6 was produced by the same method as that of surface rubber 2 except that no hollow particles were blended into the base material rubber.

—Surface Rubber 7—

A non-crosslinked rubber sheet as surface rubber 7 was produced by the same method as that of surface rubber 2 except for changing the amount (with respect to 100 parts by mass of the base material rubber) of the hollow particles to 0.5 parts by mass.

—Surface Rubber 8—

A non-crosslinked rubber sheet as surface rubber 8 was produced by the same method as that of surface rubber 2 except for changing the amount (with respect to 100 parts by mass of the base material rubber) of the hollow particles to 10 parts by mass.

—Surface Rubber 9—

A non-crosslinked rubber sheet as surface rubber 9 was produced by the same method as that of surface rubber 2 except for changing the amount (with respect to 100 parts by mass of the base material rubber) of the hollow particles to 12 parts by mass and the resin for rubber compounding to 13 parts by mass.

—Surface Rubber 10—

A non-crosslinked rubber sheet as surface rubber 10 was produced by the same method as that of surface rubber 1 except that 25 parts by mass of nylon short fibers (manufacturer: Asahi Kasei Corporation, trade name: LEONA 66, fiber length: 1 mm) were blended into 100 parts by mass of the base material rubber, in addition to the ingredients contained in surface rubber 1.

TABLE 1

| | | Surface rubber | | | | |
|---|---|---|---|---|---|---|
| — | Manufacturer/Trade name | 1 | 2 | 3 | 4 | 5 |
| EPDM | JSR Corporation/EP22 | 100 | 100 | 100 | 100 | 100 |
| HAF carbon black | Tokai Carbon Co., Ltd./SEAST 3 | 80 | 80 | 70 | 70 | 90 |
| Paraffinic oil | Sun Oil Company/SUNPAR 2280 | 8 | 4 | 5 | 8 | 5 |
| Processing aid | NOF Corporation/STEARIC ACID CAMELLIA | 1 | 1 | 1 | 1 | 1 |
| Vulcanization aid | Sakai Chemical Industry Co., Ltd./Zinc White No. 1 | 5 | 5 | 5 | 5 | 5 |
| Vulcanizer | Hosoi Chemical Industry Co., Ltd./OIL SULFUR | 2.3 | 2.3 | 2.3 | 2.3 | 2.3 |
| Vulcanization accelerator | Ouchi Shinko Chemical Industrial Co., Ltd./EP-150 | 4 | 6 | 4 | 4 | 4 |
| Resin for rubber compounding | Sumitomo Bakelite Co., Ltd./SUMILITERESIN PR-13355 | 3 | 10 | 5 | 3 | 5 |
| Hollow particles | Sekisui Chemical Co., Ltd./ADVANCELL EMS-026 | 5 | 5 | | 5 | 5 |
| Foaming agent | Sankyo Kasei Co., Ltd./CELLMIC CAP-500 | | | 5 | | |
| Total | — | 208.3 | 213.3 | 197.3 | 198.3 | 217.3 |
| Storage modulus E' (MPa) | | 28.6 | 43.6 | 33.6 | 26.4 | 36.5 |
| Average pore size (μm) | | 86 | 82 | 85 | 89 | 95 |

TABLE 2

| | | Surface rubber | | | | |
|---|---|---|---|---|---|---|
| — | Manufacturer/Trade name | 6 | 7 | 8 | 9 | 10 |
| EPDM | JSR Corporation/EP22 | 100 | 100 | 100 | 100 | 100 |
| HAF carbon black | Tokai Carbon Co., Ltd./SEAST 3 | 80 | 80 | 80 | 80 | 80 |
| Paraffinic oil | Sun Oil Company/SUNPAR 2280 | 4 | 4 | 4 | 4 | 8 |
| Processing aid | NOF Corporation/STEARIC ACID CAMELLIA | 1 | 1 | 1 | 1 | 1 |
| Vulcanization aid | Sakai Chemical Industry Co., Ltd./Zinc White No. 1 | 5 | 5 | 5 | 5 | 5 |
| Vulcanizer | Hosoi Chemical Industry Co., Ltd./OIL SULFUR | 2.3 | 2.3 | 2.3 | 2.3 | 2.3 |
| Vulcanization accelerator | Ouchi Shinko Chemical Industrial Co., Ltd./EP-150 | 6 | 6 | 6 | 6 | 4 |
| Resin for rubber compounding | Sumitomo Bakelite Co., Ltd./SUMILITERESIN PR-13355 | 10 | 10 | 10 | 13 | 3 |
| Hollow particles | Sekisui Chemical Co., Ltd./ADVANCELL EMS-026 | | 0.5 | 10 | 12 | 5 |
| Nylon short fibers | Asahi Kasei Corporation/LEONA 66, Fiber length 1 mm | | | | | 25 |
| Total | — | 208.3 | 208.8 | 218.3 | 223.3 | 233.3 |
| Storage modulus E' (MPa) | | 47.7 | 44.3 | 35.7 | 27.4 | 35.2 |
| Average pore size (μm) | | — | 92 | 84 | 92 | 89 |

<Rubber Compositions for Inner Rubber Layer of Compression Rubber Layer>

Each of inner rubbers 1-6, as will be described below, was prepared as the rubber composition for the inner rubber layer of the compression rubber layer. The constitution of each of inner rubbers 1-6 is also shown in Table 3.

Inner Rubber 1—

First, 100 parts by mass of EPDM (manufacturer: JSR Corporation, trade name: EP22) used as the base material rubber was blended with 70 parts by mass of an HAF carbon black (manufacturer: Tokai Carbon Co., Ltd., trade name: SEAST 3), 5 parts by mass of paraffinic oil (manufacturer: Sun Oil Company, trade name: SUNPAR 2280), 1 part by mass of a processing aid (manufacturer: NOF Corporation, trade name: STEARIC ACID CAMELLIA), 5 parts by mass of a vulcanization aid (manufacturer: Sakai Chemical Industry Co., Ltd., trade name: Zinc White No. 1), 2.3 parts by mass of a vulcanizer (manufacturer: Hosoi Chemical Industry Co., Ltd., trade name OIL SULFUR), 4 parts by mass of a vulcanization accelerator (manufacturer: Ouchi Shinko Chemical Industrial Co., Ltd., trade name: EP-150), and 1.7 parts by mass of a resin for rubber compounding (manufacturer: Sumitomo Bakelite Co., Ltd., trade name: SUMILITERESIN PR-13355). The resultant blend was kneaded with a Banbury mixer and the kneaded blend was then rolled with calender rolls, thereby producing a non-crosslinked rubber sheet as inner rubber 1.

—Inner Rubber 2—

A non-crosslinked rubber sheet as inner rubber 2 was produced by the same method as that of inner rubber 1 except for changing the amount (with respect to 100 parts by mass of the base material rubber) of the HAF carbon black to 80 parts by mass, the paraffinic oil to 4 parts by mass, the vulcanization accelerator to 6 parts by mass, and the resin for rubber compounding to 10 parts by mass.

—Inner Rubber 3—

A non-crosslinked rubber sheet as inner rubber 3 was produced by the same method as that of inner rubber 1 except for changing the amount (with respect to 100 parts by mass of the base material rubber) of the resin for rubber compounding to 5 parts by mass.

—Inner Rubber 4—

A non-crosslinked rubber sheet as inner rubber 4 was produced by the same method as that of inner rubber 1 except for changing the amount (with respect to 100 parts by mass of the base material rubber) of the resin for rubber compounding to 5 parts by mass, and further adding 5 parts by mass of hollow particles (manufacturer: Sekisui Chemical Co., Ltd., trade name: ADVANCELL EMS-026) with respect to 100 parts by mass of the base material rubber.

—Inner rubber 5—

A non-crosslinked rubber sheet as inner rubber 5 was produced by the same method as that of inner rubber 1 except for changing the amount (with respect to 100 parts by mass of the base material rubber) of the HAF carbon black to 60 parts by mass and the paraffinic oil to 10 parts by mass.

—Inner rubber 6—

A non-crosslinked rubber sheet as inner rubber 6 was produced by the same method as that of inner rubber 1 except for changing the amount (with respect to 100 parts by mass of the base material rubber) of the HAF carbon black to 90 parts by mass, the paraffinic oil to 4 parts by mass, the vulcanizer to 2.5 parts by mass, the vulcanization accelerator to 6 parts by mass of, and the resin for rubber compounding to 10 parts by mass.

TABLE 3

| — | Manufacturer/Trade name | Inner rubber 1 | 2 | 3 | 4 | 5 | 6 |
|---|---|---|---|---|---|---|---|
| EPDM | JSR Corporation/EP22 | 100 | 100 | 100 | 100 | 100 | 100 |
| HAF carbon black | Tokai Carbon Co., Ltd./SEAST 3 | 70 | 80 | 70 | 70 | 60 | 90 |
| Paraffinic oil | Sun Oil Company/SUNPAR 2280 | 5 | 4 | 5 | 5 | 10 | 4 |
| Processing aid | NOF Corporation/STEARIC ACID CAMELLIA | 1 | 1 | 1 | 1 | 1 | 1 |
| Vulcanization aid | Sakai Chemical Industry Co., Ltd./Zinc White No. 1 | 5 | 5 | 5 | 5 | 5 | 5 |
| Vulcanizer | Hosoi Chemical Industry Co., Ltd./OIL SULFUR | 2.3 | 2.3 | 2.3 | 2.3 | 2.3 | 2.5 |
| Vulcanization accelerator | Ouchi Shinko Chemical Industrial Co., Ltd./EP-150 | 4 | 6 | 4 | 4 | 4 | 6 |
| Resin for rubber compounding | Sumitomo Bakelite Co., Ltd./SUMILITERESIN PR-13355 | 1.7 | 10 | 5 | 5 | 1.7 | 10 |
| Hollow particles | Sekisui Chemical Co., Ltd./ADVANCELL EMS-026 | | | | 5 | | |
| Total | — | 189.0 | 208.3 | 192.3 | 197.3 | 184.0 | 218.5 |
| | Storage modulus E' (MPa) | 32.6 | 47.7 | 36.1 | 35.5 | 27.8 | 51.3 |
| | Average pore size (μm) | — | — | — | 94 | — | — |

<Rubber Compositions for Adhesion Rubber Layer and Backing Rubber Layer, and Twisted Yarn for Cord>

A non-crosslinked rubber sheet made of an EPDM rubber composition was produced as a rubber composition for the adhesion rubber layer, and a non-crosslinked rubber sheet made of an EPDM rubber composition was produced as a rubber composition for the backing rubber layer.

Twisted yarn made of polyester fibers with the structure of 1,100 dtex/2×3 (the number of second twists: 9.5 T/10 cm (Z), the number of first twists: 2.19 T/10 cm, manufacturer: Teijin Limited) was used for the cord. The twisted yarn was sequentially subjected to: a treatment in which the twisted yarn was soaked in a toluene solution containing 20% by mass (solid content concentration) of isocyanate and then heat-dried at 240° C. for 40 seconds; a treatment in which the twisted yarn was soaked in an RFL aqueous solution and then heat-dried at 200° C. for 80 seconds; and a treatment in which the twisted yarn was soaked in rubber cement prepared by dissolving the rubber composition for the adhesion rubber layer in toluene and then heat-dried at 60° C. for 40 seconds.

(V-Ribbed Belt)

V-ribbed belts of Examples 1-15 and Comparative Examples 1-6, as will be described below, were fabricated for test evaluation. The configurations of the V-ribbed belts are shown in Tables 4-9.

Example 1

The V-ribbed belt of Example 1 was fabricated by a method similar to the fabrication method of the embodiment, using surface rubber 1 as the rubber composition for the surface rubber layer of the compression rubber layer, inner rubber 1 as the rubber composition for the inner rubber layer of the compression rubber layer, the rubber composition for the adhesion rubber layer, the rubber composition for the backing rubber layer, and the twisted yarn for the cord.

The V-ribbed belt of Example 1 had a belt total length of 1117 mm, a belt thickness of 4.3 mm, a V-rib height of 2.0 mm, and three V-ribs (belt width: 10.68 mm). The surface rubber layer of the V-ribbed belt of Example 1 had a thickness of 400 μm.

Example 2

The V-ribbed belt of Example 2 was fabricated by the same method as that of Example 1 except that surface rubber 2 was used as the rubber composition for the surface rubber layer of the compression rubber layer and inner rubber 2 was used as the rubber composition for the inner rubber layer of the compression rubber layer.

Example 3

The V-ribbed belt of Example 3 was fabricated by the same method as that of Example 1 except that surface rubber 3 was used as the rubber composition for the surface rubber layer of the compression rubber layer and inner rubber 3 was used as the rubber composition for the inner rubber layer of the compression rubber layer.

Example 4

The V-ribbed belt of Example 4 was fabricated by the same method as that of Example 1 except that the surface rubber layer had a thickness of 40 μm.

Example 5

The V-ribbed belt of Example 5 was fabricated by the same method as that of Example 1 except that the surface rubber layer had a thickness of 60 μm.

Example 6

The V-ribbed belt of Example 6 was fabricated by the same method as that of Example 1 except that the surface rubber layer had a thickness of 450 μm.

Example 7

The V-ribbed belt of Example 7 was fabricated by the same method as that of Example 1 except that the surface rubber layer had a thickness of 550 μm.

Example 8

The V-ribbed belt of Example 8 was fabricated by the same method as that of Example 1 except that surface rubber 1 was used as the rubber composition for the surface rubber layer of the compression rubber layer, inner rubber 3 was used as the rubber composition for the inner rubber layer of the compression rubber layer, and the storage modulus E' in the belt length direction of the surface rubber layer, which will be described later, and the average pore size of the pores were set at 35.7 MPa and 44 μm, respectively, by regulating the molding pressure.

Example 9

The V-ribbed belt of Example 9 was fabricated by the same method as that of Example 8 except that the storage modulus E' in the belt length direction of the surface rubber layer and the average pore size of the pores were set at 25.4 MPa and 147 μm, respectively, by regulating the molding pressure.

Example 10

The V-ribbed belt of Example 10 was fabricated by the same method as that of Example 8 except that the storage modulus E' in the belt length direction of the surface rubber layer and the average pore size of the pores were set at 23.4 MPa and 169 μm, respectively, by regulating the molding pressure.

Example 11

The V-ribbed belt of Example 11 was fabricated by the same method as that of Example 2 except that surface rubber 7 was used as the rubber composition for the surface rubber layer of the compression rubber layer.

Example 12

The V-ribbed belt of Example 12 was fabricated by the same method as that of Example 2 except that surface rubber 8 was used as the rubber composition for the surface rubber layer of the compression rubber layer.

Example 13

The V-ribbed belt of Example 13 was fabricated by the same method as that of Example 2 except that surface rubber 9 was used as the rubber composition for the surface rubber layer of the compression rubber layer.

Comparative Example 1

The V-ribbed belt of Comparative Example 1 was fabricated by the same method as that of Example 1 except that inner rubber 3 was used as the rubber composition for the surface rubber layer of the compression rubber layer and as the rubber composition for the inner rubber layer of the compression rubber layer. The compression rubber layer of Comparative Example 1 had a single layer structure made of inner rubber 3.

Comparative Example 2

The V-ribbed belt of Comparative Example 2 was fabricated by the same method as that of Example 1 except that inner rubber 4 was used as the rubber composition for the surface rubber layer of the compression rubber layer and as the rubber composition for the inner rubber layer of the compression rubber layer. The compression rubber layer of Comparative Example 2 had a single layer structure made of inner rubber 4.

Comparative Example 3

The V-ribbed belt of Comparative Example 3 was fabricated by the same method as that of Example 1 except that surface rubber 4 was used as the rubber composition for the surface rubber layer of the compression rubber layer and inner rubber 5 was used as the rubber composition for the inner rubber layer of the compression rubber layer.

Comparative Example 4

The V-ribbed belt of Comparative Example 4 was fabricated by the same method as that of Example 1 except that surface rubber 2 was used as the rubber composition for the surface rubber layer of the compression rubber layer and inner rubber 6 was used as the rubber composition for the inner rubber layer of the compression rubber layer.

Comparative Example 5

The V-ribbed belt of Comparative Example 5 was fabricated by the same method as that of Example 1 except that surface rubber 5 was used as the rubber composition for the surface rubber layer of the compression rubber layer and inner rubber 1 was used as the rubber composition for the inner rubber layer of the compression rubber layer.

Comparative Example 6

The V-ribbed belt of Comparative Example 6 was fabricated by the same method as that of Example 8 except that the storage modulus E' in the belt length direction of the surface rubber layer and the average pore size of the pores were set at 41.2 MPa and 35 μm, respectively, by regulating the molding pressure.

Comparative Example 7

The V-ribbed belt of Comparative Example 7 was fabricated by the same method as that of Example 2 except that surface rubber 6 was used as the rubber composition for the surface rubber layer of the compression rubber layer.

Comparative Example 8

The V-ribbed belt of Comparative Example 8 was fabricated by the same method as that of Example 1 except that surface rubber 10 was used as the rubber composition for the surface rubber layer of the compression rubber layer.

TABLE 4

|  | Example 1 | Example 2 | Example 3 |
| --- | --- | --- | --- |
| Surface rubber layer | Surface rubber 1 | Surface rubber 2 | Surface rubber 3 |
| Thickness of surface rubber layer (μm) | 400 | 400 | 400 |
| E' (MPa) of surface rubber layer | 28.6 | 43.6 | 33.6 |
| Inner rubber layer | Inner rubber 1 | Inner rubber 2 | Inner rubber 3 |
| E' (MPa) of inner rubber layer | 32.6 | 47.7 | 36.1 |
| Means for forming pores | Hollow particles | Hollow particles | Foaming agent |
| Average pore size (μm) | 86 | 82 | 85 |
| Bending fatigue lifetime (hours) | 1000 or more | 960 | 1000 or more |
| Slip noise evaluation | None | None | Low |

TABLE 5

|  | Comparative Example 1 | Comparative Example 2 | Comparative Example 3 | Comparative Example 4 | Comparative Example 5 |
| --- | --- | --- | --- | --- | --- |
| Surface rubber layer | Inner rubber 3 | Inner rubber 4 | Surface rubber 4 | Surface rubber 2 | Surface rubber 5 |
| Thickness of surface rubber layer (μm) | 400 | 400 | 400 | 400 | 400 |
| E' (MPa) of surface rubber layer | 36.1 | 35.5 | 26.4 | 43.6 | 36.5 |
| Inner rubber layer | Inner rubber 3 | Inner rubber 4 | Inner rubber 5 | Inner rubber 6 | Inner rubber 1 |
| E' (MPa) of inner rubber layer | 36.1 | 35.5 | 27.8 | 51.3 | 32.6 |
| Means for forming pores | — | Hollow particles | Hollow particles | Hollow particles | Hollow particles |
| Average pore size (μm) | — | 94 | 89 | 82 | 95 |
| Bending fatigue lifetime (hours) | 1000 or more | 648 | 1000 or more | 600 | 720 |
| Slip noise evaluation | Loud | None | Loud | None | None |

TABLE 6

|  | Example 4 | Example 5 | Example 1 | Example 6 | Example 7 |
| --- | --- | --- | --- | --- | --- |
| Surface rubber layer | Surface rubber 1 | Surface rubber 1 | Surface rubber 1 | Surface rubber 1 | Surface rubber 1 |
| Thickness of surface rubber layer (μm) | 40 | 60 | 400 | 450 | 550 |
| E' (MPa) of surface rubber layer | 28.6 | 28.6 | 28.6 | 28.6 | 28.6 |
| Inner rubber layer | Inner rubber 1 | Inner rubber 1 | Inner rubber 1 | Inner rubber 1 | Inner rubber 1 |
| E' (MPa) of inner rubber layer | 32.6 | 32.6 | 32.6 | 32.6 | 32.6 |
| Means for forming pores | Hollow particles | Hollow particles | Hollow particles | Hollow particles | Hollow particles |

TABLE 6-continued

|  | Example 4 | Example 5 | Example 1 | Example 6 | Example 7 |
|---|---|---|---|---|---|
| Average pore size (μm) | 86 | 86 | 86 | 86 | 86 |
| Bending fatigue lifetime (hours) | 1000 or more | 1000 or more | 1000 or more | 1000 or more | 856 |
| Slip noise evaluation | Medium | Low | None | None | None |

TABLE 7

|  | Comparative Example 6 | Example 8 | Example 9 | Example 10 |
|---|---|---|---|---|
| Surface rubber layer | Surface rubber 1 | Surface rubber 1 | Surface rubber 1 | Surface rubber 1 |
| Thickness of surface rubber layer (μm) | 400 | 400 | 400 | 400 |
| E' (MPa) of surface rubber layer | 41.2 | 35.7 | 25.4 | 23.4 |
| Inner rubber layer | Inner rubber 3 | Inner rubber 3 | Inner rubber 3 | Inner rubber 3 |
| E' (MPa) of inner rubber layer | 36.1 | 36.1 | 36.1 | 36.1 |
| Means for forming pores | Hollow particles | Hollow particles | Hollow particles | Hollow particles |
| Average pore size (μm) | 35 | 44 | 147 | 169 |
| Bending fatigue lifetime (hours) | 1000 or more | 1000 or more | 921 | 836 |
| Slip noise evaluation | Loud | Medium | None | None |

TABLE 8

|  | Comparative Example 7 | Example 11 | Example 2 | Example 12 | Example 13 |
|---|---|---|---|---|---|
| Surface rubber layer | Surface rubber 6 | Surface rubber 7 | Surface rubber 2 | Surface rubber 8 | Surface rubber 9 |
| Thickness of surface rubber layer (μm) | 400 | 400 | 400 | 400 | 400 |
| E' (MPa) of surface rubber layer | 47.7 | 44.3 | 43.6 | 35.7 | 27.4 |
| Inner rubber layer | Inner rubber 2 | Inner rubber 2 | Inner rubber 2 | Inner rubber 2 | Inner rubber 2 |
| E' (MPa) of inner rubber layer | 47.7 | 47.7 | 47.7 | 47.7 | 47.7 |
| Means for forming pores | — | Hollow particles | Hollow particles | Hollow particles | Hollow particles |
| Average pore size (μm) | — | 92 | 82 | 84 | 92 |
| Bending fatigue lifetime (hours) | 1000 or more | 1000 or more | 960 | 824 | 755 |
| Slip noise evaluation | Loud | Low | None | None | None |

TABLE 9

|  | Example 1 | Comparative Example 8 |
|---|---|---|
| Surface rubber layer | Surface rubber 1 | Surface rubber 10 |
| Thickness of surface rubber layer (μm) | 400 | 400 |
| E' (MPa) of surface rubber layer | 28.6 | 35.2 |
| Inner rubber layer | Inner rubber 1 | Inner rubber 1 |
| E' (MPa) of inner rubber layer | 32.6 | 32.6 |
| Means for forming pores | Hollow particles | Hollow particles |
| Average pore size (μm) | 86 | 89 |
| Bending fatigue lifetime (hours) | 1000 or more | 537 |
| Slip noise evaluation | None | None |

(Test Evaluation Method)

<Storage Modulus E' at 25° C. in Belt Length Direction>

In conformity with JIS K6394, each of surface rubbers 1-10 and inner rubbers 1-6 was molded into a rubber sheet, and a predetermined test peace which was cut out from each rubber sheet was subjected to a measurement of the storage modulus E' at 25° C. in the drawing direction corresponding to the belt length direction. The molding pressures applied to the rubber sheets were made to correspond to those of the belt molding condition of Examples 1-7 and 11-13 and Comparative Examples 1-5 and 7-8, exclusive of Examples 8-10 and Comparative Example 6.

<Average Pore Size of Pores>

For each of surface rubber 1-5 and 7-10 and the inner rubber 2, an image for observation of the cut surface of the molded rubber sheet was obtained at 175-fold magnification by using a digital microscope (manufacturer: Keyence Corporation, model number: VHX-200). Pore sizes of an arbitrary number of the pores showed in each obtained image for observation were measured by means of a measurement mode of the digital microscope, and the average pore sizes of the pores were calculated.

<Test for Bending Fatigue>

Figure 10:
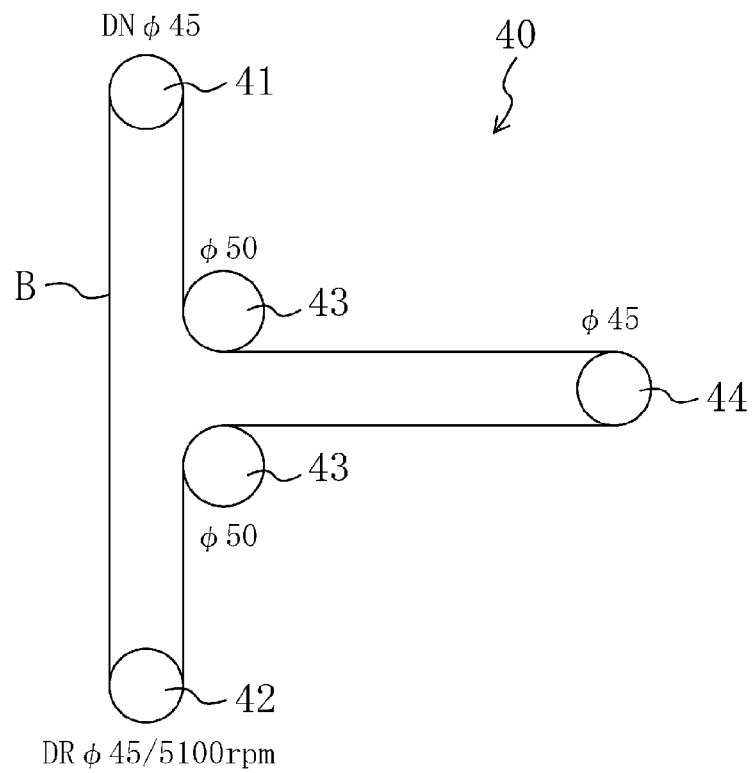
FIG. 10 is a diagram showing a layout of pulleys in a multi-axis bending belt running test machine used to evaluate resistance to bending fatigue.

FIG. 10 shows a layout of pulleys in a multi-axis bending belt running test machine 40 used to evaluate the resistance to bending fatigue of the V-ribbed belt B.

The multi-axis bending belt running test machine 40 has a structure including: a first driven pulley 41 and a drive pulley 42 which are ribbed pulleys with a pulley diameter of 45 mm and disposed at upper and lower positions, respectively; a pair of idler pulleys 43 which are flat pulleys with a pulley diameter of 50 mm and disposed to the right of the vertical midway between the pulleys 41 and 42; and a second driven pulley 44 which is a ribbed pulley with a pulley diameter of 45 mm and disposed to the right of the vertical midway between the pulleys 43.

Each V-ribbed belt of Examples 1-13 and Comparative Examples 1-8 was set in the multi-axis bending belt running test machine 40 in the following manner. Each V-ribbed belt was wrapped around the first and second driven pulleys 41 and 44 and the drive pulley 42 with the V-ribs in contact with the pulleys 41, 44 and 42, and around the pair of the idler pulleys 43 with the belt back face in contact with the pulleys 43. A deadweight of 588.4 N was imposed on the first driven pulley 41 by setting the first driven pulley 41 in an upwardly pulled state. Each V-ribbed belt B was allowed to run by rotating the drive pulley 42 at 5100 rpm. Then, the period of time before a crack was observed in any of the V-ribs on each V-ribbed belt B was measured as a bending fatigue lifetime.

<Slip Noise Test>

Figure 11:
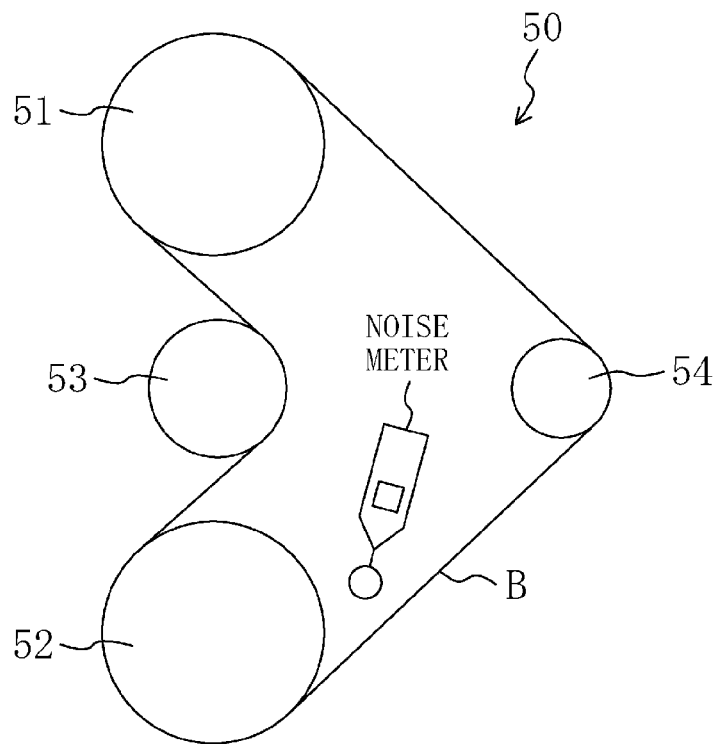
FIG. 11 is a diagram showing a layout of pulleys in a belt running test machine for a measurement of slip noise.

FIG. 11 shows a layout of pulleys in a belt running test machine 50 for measurement of slip noise produced by the V-ribbed belt B.

The belt running test machine 50 has a structure including: a first driven pulley 51 and a drive pulley 52 which are ribbed pulleys with a pulley diameter of 120 mm and disposed at upper and lower positions, respectively; an idler pulley 53 which has a pulley diameter of 70 mm and is disposed vertically midway between the pulleys 51 and 52; and a second driven pulley 54 which is a ribbed pulley with a pulley diameter of 55 mm and disposed to the right of the idler pulley 53. The idler pulley 53 and the second driven pulley 54 are arranged in such a manner that the wrap-around angle of the V-ribbed belt on each of the pulleys 53 and 54 is 90°.

Each V-ribbed belt of Examples 1-13 and Comparative Examples 1-8 was set in the belt running test machine 50 for measurement of slip noise in the following manner. Each V-ribbed belt was wrapped around the first and second driven pulleys 51 and 54 and the drive pulley 52 with the V-ribs in contact with the pulleys 51, 54 and 52 and around the idler pulley 53 with the belt back face in contact with the pulley 53, torque loads of 2.5 kW per V-rib were applied to the first driven pulley 51, and the second driven pulley 54 was set in a sideways-pulled state such that a set weight of 277 N was imposed per V-rib. The V-ribbed belt B was allowed to run by rotating the drive pulley 52 at 4900 rpm, and water was poured on the drive pulley 52 at a rate of 200 ml/min. Then, the slip noise produced in running of the V-ribbed belt B was evaluated by means of a sensory evaluation and graded from "loud" to "none."

(Test Evaluation Results)

The results of the test evaluations are shown in Tables 1-9.

The storage modulus E' at 25° C. in the belt length direction was as follows: surface rubber 1, 28.6 MPa; surface rubber 2, 43.6 MPa; surface rubber 3, 33.6 MPa; surface rubber 4, 26.4 MPa; surface rubber 5, 36.5 MPa; surface rubber 6, 47.7 MPa; surface rubber 7, 44.3 MPa; surface rubber 8, 35.7 MPa; surface rubber 9, 27.4 MPa; surface rubber 10, 35.2 MPa; inner rubber 1, 32.6 MPa; inner rubber 2, 47.7 MPa; inner rubber 3, 36.1 MPa; inner rubber 4, 35.5 MPa; inner rubber 5, 27.8 MPa; and inner rubber 6, 51.3 MPa.

The average pore size of the pores was as follows: surface rubber 1, 86 μm; surface rubber 2, 82 μm, surface rubber 3, 85 μm; surface rubber 4, 89 μm; surface rubber 5, 95 μm; surface rubber 7, 92 μm; surface rubber 8, 84 μm; surface rubber 9, 92 μm; surface rubber 10, 89 μm; and inner rubber 2, 94 μm.

The bending fatigue lifetime was as follows: Example 1, 1000 hours or more; Example 2, 960 hours; Example 3, 1000 hours or more; Example 4, 1000 hours or more; Example 5, 1000 hours or more; Example 6, 1000 hours or more; Example 7, 856 hours; Example 8, 1000 hours or more; Example 9, 921 hours; Example 10, 836 hours; Example 11, 1000 hours or more, Example 12, 824 hours; Example 13, 755 hours; Comparative Example 1, 1000 hours or more; Comparative Example 2, 648 hours; Comparative Example 3, 1000 hours or more; Comparative Example 4, 600 hours; Comparative Example 5, 720 hours; Comparative Example 6, 1000 hours or more; Comparative Example 7, 1000 hours or more; and Comparative Example 8, 537 hours.

The evaluation of the slip noise was as follows: Example 1, "none"; Example 2, "none"; Example 3, "low"; Example 4, "medium"; Example 5, "low"; Example 6, "none"; Example 7, "none"; Example 8, "medium"; Example 9, "none", Example 10, "none"; Example 11, "low"; Example 12, "none"; Example 13, "none", Comparative Example 1, "loud"; Comparative Example 2, "none"; Comparative Example 3, "loud"; Comparative Example 4, "none"; Comparative Example 5, "none"; Comparative Example 6, "loud"; Comparative Example 7, "loud"; and Comparative Example 8, "none".

INDUSTRIAL APPLICABILITY

The present disclosure is useful for friction drive belts.

DESCRIPTION OF REFERENCE CHARACTERS

B V-ribbed belt (friction drive belt)
10 V-ribbed belt body
11 Compression rubber layer
11a Surface rubber layer
11b Inner rubber layer
16 Pores
17 Hollow particles

The invention claimed is:

1. A friction drive belt comprising a compression rubber layer which is provided on an inner periphery of a belt body and transmits power between pulleys upon coming into contact with the pulleys, wherein
the compression rubber layer includes a surface rubber layer having numerous pores, of which an average pore size is 80 to 120 μm, on a pulley contact surface, and an inner rubber layer which is provided toward an inside of the belt relative to the surface rubber layer, the inner rubber layer has storage modulus at 25° C. in a belt length direction higher than that of the surface rubber layer and is in the range from 30 to 50 MPa.

2. The friction drive belt of claim 1, wherein
the surface rubber layer has a thickness of 50-500 μm.

3. The friction drive belt of claim 1, wherein
the surface rubber layer has a storage modulus at 25° C. in the belt length direction of 20-45 MPa.

4. The friction drive belt of claim 1, wherein
the numerous pores formed on the pulley contact surface of the surface rubber layer are made of partially cut away hollow particles blended into a rubber composition forming the surface rubber layer.

5. The friction drive belt of claim 4, wherein
the hollow particles contained in the rubber composition forming the surface rubber layer are blended in an amount of 0.5-10 parts by mass with respect to 100 parts by mass of a base material rubber.

6. The friction drive belt of claim 1, wherein
the numerous pores formed on the pulley contact surface of the surface rubber layer are made of partially cut away hollows produced by a foaming agent blended into a rubber composition forming the surface rubber layer.

7. The friction drive belt of claim 6, wherein
the foaming agent contained in the rubber composition forming the surface rubber layer is blended in an amount of 1-15 parts by mass with respect to 100 parts by mass of a base material rubber.

8. The friction drive belt of claim 1, wherein
the rubber composition forming the surface rubber layer contains no short fibers.

9. The friction drive belt of claim 1, wherein
a rubber composition forming the inner rubber layer contains no hollow particles and no foaming agents.

10. The friction drive belt of claim 1, wherein
the base material rubber for the rubber composition forming the surface rubber layer is identical with a base material rubber for the rubber composition forming the inner rubber layer.

11. The friction drive belt of claim 10, wherein
the base material rubber for the rubber composition forming the surface rubber layer and for the rubber composition forming the inner rubber layer is an ethylene-α-olefin elastomer.

12. The friction drive belt of claim 1, wherein,
the belt body is a V-ribbed belt body.

13. A belt transmission system in which the friction drive belt of any one of claims 1-12 is wrapped around a plurality of pulleys.

14. A friction drive belt comprising a compression rubber layer which is provided on an inner periphery of a belt body and transmits power between pulleys upon coming in contact with the pulleys, wherein
the compression rubber layer includes a surface rubber layer having numerous pores, of which an average pore size is 80 to 120 μm, on a pulley contact surface, and an inner rubber layer which is provided toward an inside of the belt relative to the surface rubber layer, the inner rubber layer contains no hollows, and has storage modulus at 25° C. in a belt length direction that is higher than that of the surface rubber layer and is in the range from 30 to 50 MPa.

* * * * *